Figure 1:
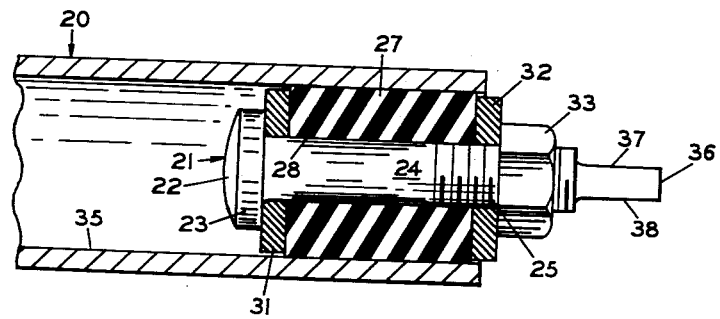

July 25, 1961

W. A. CARLILE, JR., ET AL 2,993,616

EXPANSIBLE CLOSURE

Filed June 4, 1959

INVENTORS
WILLIAM A. CARLILE, JR.
WILLIAM M. O'LEARY
BY

Schmieding and Fultz

ATTORNEYS

United States Patent Office 2,993,616
Patented July 25, 1961

---

2,993,616
EXPANSIBLE CLOSURE
William A. Carlile, Jr., and William M. O'Leary, Columbus, Ohio, assignors to Columbus Bolt & Forging Company, Columbus, Ohio, a corporation of Ohio
Filed June 4, 1959, Ser. No. 818,213
1 Claim. (Cl. 220—24.5)

This invention relates to an improved sealing device for closing the ends of conduits.

In general the sealing device of the present invention includes a bolt provided with a head portion, a shank portin, and a threaded end portion. The shank portion of the bolt is extended freely through a first metal member and the threaded end portion of the bolt extends into the bore of a second metal member. A resilient cylinder member, formed of synthetic rubber or the like, is mounted between confronting ends of said metal members whereby rotation of the bolt moves the metal members one towards the other and expands said resilient member outwardly into sealed contact with the inner wall surface of a pipe.

As one aspect of the present invention the sealing device is inserted into the end of a pipe with the head portion of the bolt facing inwardly. The opposite threaded end portion of the bolt carries a nut and the tip of said end portion is provided with a flat surface for engagement by a tool to prevent rotation of the bolt when said nut is being tightened to radially expand the resilient member.

As still another aspect of the present invention the threaded end of the bolt is provided with a flattened tip having a greater width than the diameter of the threaded end portion of the bolt to retain the nut and other components of the sealing device together as an assembly. Moreover, the flattened tip provides means for gripping the bolt with a wrench to prevent rotation of the bolt while the nut is being tightened to radially expand the resilient sealing member.

It is therefore an object of the present invention to provide a sealing device for a pipe end which device utilizes a combination of conventional bolts, washers, and nuts, to provide a simple device that is inexpensive to fabricate.

Further objects and advantages of the present invention will be apparent from the following description, reference being had to the accompanying drawings wherein a preferred form of embodiment of the invention is clearly shown.

Figure 2:
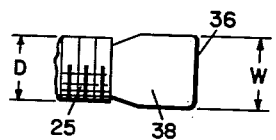

In the drawings:

FIG. 1 is a side sectional view of a pipe end and sealing device constructed according to the present invention, said section being taken along a vertical plane through the center line of the assembly; and FIG. 2 is a partial top elevational view of a portion of the sealing device of FIG. 1.

Referring in detail to the drawing, a pipe, indicated generally at 20, has inserted in its open end a sealing device, indicated generally at 21, which device includes a bolt 22 having a head portion 23, a shank portion 24, and a threaded end portion 25. A cylindrical resilient member 27 formed of synthetic rubber or the like includes a hole 28 for receiving the shank 24 and a portion of the threaded portion 25 of bolt 22.

Washers 31 and 32 are positioned on each end of resilient member 27 such that when a nut 33 is tightened washers 31 and 32 axially compress and radially expand resilient member 27 into sealed engagement with inner surface 35 of pipe 20.

Bolt 22 includes a tip 36 that is coined after assembly of the device 21 to provide flats 37 and 38 which provide means for gripping the bolt with a wrench when nut 33 is tightened to radially expand resilient member 27.

With reference to FIG. 2 the width W of tip 36 is greater than the diameter D of threaded portion 25 whereby nut 33 cannot be removed from the bolt. Hence the parts of the assembly cannot become inadvertently disassembled and lost.

It has been found that by making the axial length of resilient member 27 relatively long a high degree of radial bulging can be achieved whereby the assembly 21, of a given size, can be used to seal a relatively large range of pipe diameters.

While the form of embodiment of the present invention as herein disclosed constitutes a preferred form, it is to be understood that other forms might be adopted, all coming within the scope of the claim which follows.

We claim:

A sealing device for a pipe end comprising, in combination, a bolt including a head portion and a shank having a portion provided with threads at the end remote from said head portion; a resilient cylindrical means including an inner bore closely surrounding said shank portion and an outer surface for directly engaging the inner surface of said pipe end; means on said bolt shank adjacent said head portion forming a radially extending surface engaging one end of said resilient means; a washer on said bolt forming a second radially extending surface engaging the other end of said resilient means; and a nut on said threads, said shank being provided with an integral extension projecting a substantial distance axially beyond said threaded portion, the transverse dimension of said extension outwardly of said nut being substantially greater than the diameter of said threads, said extension including axially extending parallel flats that provide means for gripping said bolt with a tool when said nut is tightened.

References Cited in the file of this patent

UNITED STATES PATENTS

| | | |
|---|---|---|
| 31,856 | Wilson | Mar. 26, 1861 |
| 49,671 | Willmott | Aug. 29, 1865 |
| 100,115 | Brown | Feb. 22, 1870 |
| 596,612 | North | Jan. 4, 1898 |
| 624,363 | Moore | May 2, 1899 |
| 1,377,840 | Latham | May 10, 1921 |
| 1,495,000 | Cuthbertson | May 20, 1924 |
| 1,789,024 | Roswell | Jan. 13, 1931 |
| 2,277,885 | Rodanet | Mar. 31, 1942 |
| 2,393,747 | Buchanan | Jan. 29, 1946 |
| 2,763,293 | Kruck | Sept. 18, 1956 |

FOREIGN PATENTS

| | | |
|---|---|---|
| 913,330 | Germany | June 10, 1954 |
| 18,953 | Great Britain | 1910 |
| 587,289 | Great Britain | Apr. 21, 1947 |
| 750,231 | Great Britain | June 13, 1956 |